United States Patent [19]
Florent

[11] Patent Number: 5,187,689
[45] Date of Patent: Feb. 16, 1993

[54] DEVICE FOR SELECTIVELY DETECTING A MOVING OBJECT

[75] Inventor: Raoul Florent, Lillers, France

[73] Assignee: U.S. Philips Corporation, New York, N.Y.

[21] Appl. No.: 783,287

[22] Filed: Oct. 28, 1991

[30] Foreign Application Priority Data

Oct. 30, 1990 [FR] France ............................. 90 13442

[51] Int. Cl.⁵ .................................................. G06F 15/70
[52] U.S. Cl. ........................................ 367/99; 367/95
[58] Field of Search .................... 367/95, 99; 342/61, 342/62, 67; 356/3; 364/561

Primary Examiner—Daniel T. Pihulic
Attorney, Agent, or Firm—Robert J. Kraus

[57] ABSTRACT

A device for selectively detecting in real time a moving object progressing on a path in a multidimensional space, the device comprising first means determining an efficiency, corresponding to the ratio of net displacement to total distance travelled, and for selecting moving objects on the basis of this ratio. To account for objects making half turns in an otherwise efficient path, from the data constituted by the measurements of displacements of the moving object, an average of the efficiency of motion is used. The device is useful, for example, for real-time image sequence processing in conjunction with the tracking of moving objects.

7 Claims, 2 Drawing Sheets

DEVICE FOR SELECTIVELY DETECTING A MOVING OBJECT

BACKGROUND OF THE INVENTION

1. Field of the Invention

The invention relates to the selective detection of moving objects. This may be applied for example in surveillance systems or in devices for preventing collisions with moving objects, such as in passenger cars, or for provoking such collisions, such as in missiles.

A technical requirement encountered, for example, in producing a device which must respond physically to observed moving objects, or invests a considerable amount of computation effort in an observed object, is that objects worthy of such response must be selected. Therefor, on the basis of measurements of the time development of spatial coordinates or velocity of the object, a decision must be formed whether these measurements correspond to an object which deserves further attention or not.

2. Description of the Related Art

From the prior art, criteria for such a decision are already known, for example the criterion utilized in what is called Kalman filtering, based on path prediction. Thus, in accordance with this criterion, a path model is made and on the basis of the coordinates obtained, one builds a prediction of the next coordinates, that is to say a prediction of the next point; the difference between the estimated value and the effective value of the coordinates of this point is evaluated, and thus the energy of the prediction error is measured. If this energy is low, a device can estimate the motion, that is to say it will decide that a moving object having a coherent motion is involved since it is predictable. If this energy is high, it will decide that there is an incoherent motion, as it cannot be predicted in accordance with the displacement model chosen.

However, when the case is considered in which coordinates are involved which are provided by objects of large extension, which move in a rather slow manner, or which come from a not very reliable extractor, the devices putting into effect the measurements based on the prediction do not provide good results. Actually, in the above case, the uncertainty about the measurements may be of the order of the extension of these displacements and often one is faced with what seems to be an incoherent motion made up of numerous half-turns, due to the uncertainty about the coordinates.

SUMMARY OF THE INVENTION

The present invention has for its object to provide a device which is capable of selecting objects on the basis of purposefulness of their motion.

According to the invention, this object is achieved by a device for outputting a selection signal indicating selective detection of physical objects on the basis of their motion, the device comprising
first measuring means with a first output for a displacement signal representative of a measured amount of net displacement of the object during a time interval,
second measuring means with a second output for a path length signal representative of a sum of measured distances travelled by the object during respective subintervals of the time interval,
comparing means, with inputs coupled for receiving the displacement signal and the path length signal, and a selection output for outputting a selection signal which indicates selection, when a strength of the displacement signal exceeds a predetermined fraction of a strength of the path length signal.

If the moving object is considered over a time interval of sufficient duration, it appears that, although often submitted to to and fro movements, this object nevertheless has a tendency of progressing in a given direction, i.e. it has a net displacement which is said to be purposeful. This is used for the selective detection.

The first and second measurement may be based for example on position data acquired from successive images in which the object appears, or from observations of its speed, for example using doppler shift of reflected radiation. The first and second measurement may also use different acquisition sources for measuring the displacements and distances respectively.

This device has inter alia the following advantages:
it provides a selection which is applicable to slow moving objects which are not pointsized;
the selection is valid even for the case in which the extractor supplies imprecise data, that is to say, for example, when the coordinates are only known with a precision in the order of magnitude of the elementary displacements;
the threshold is independent of motion scale. Thus, if a map representing the path of the moving object is expanded, or if this map is contracted, the ratio between the distances remains constant. Moreover, a faster moving object, but one which does not displace itself with great efficiency, will furnish the same measurement as a slow moving object.
the selection is nevertheless discriminative against the motions declared to be non-purposeful;

In an embodiment of the invention, said displacement and path length signal are time dependent signals, as a function of a temporal position of the time interval, the comparing means comprising
efficiency determining means, with inputs coupled for receiving the displacement signal and the path length signal, and an efficiency output for outputting an efficiency signal formed as a ratio of the displacement signal and the path length signal,
averaging means, with an input coupled for receiving the efficiency signal, and an average output, for outputting an average of the efficiency signal over a further time interval,
average comparing means, with an input coupled for receiving the average, and an output for outputting said selection signal when said average exceeds a predetermined threshold.
This has the advantage that the measurement remains valid even when the moving objects effects half-turns at a few time instants.

When the object is capable of moving in a multidimensional space, the comparison of net displacement with total path length can in principle be performed by calculating sum of the square of the distances and displacements along separate coordinate axes and comparing these quantities. However, an embodiment of the device according to the invention, is arranged for measuring movements of the object in a multidimensional space, the device comprising a plurality of respective first and second measuring means coupled to respective comparing means, each respective first and second measuring means from the plurality being arranged for forming the net displacement and path length signal for displacements and distances travelled in projection upon a respective spatial direction, the device comprising combination means, with inputs coupled for receiving respective selection signal from each respective comparing means, and a combination output outputting a further selection signal when at least one of said respective selection signals indicates selection of the object.

Thus, the device has the advantage that it provides a selection which properly satisfies a motion efficiency criterion, when the moving objects moves in an efficient manner in at least one direction, however without requiring complex arithmetic operations to reach a detection. For full coverage of all possible motions it is required that the directions are linearly independent, and that there are at least as many linearly independent directions as there are dimensions in which the object can move. For example, a set of orthogonal coordinate axis would provide such spatial directions.

In, for example, a two-dimensional space, this device will render it possible to decide that a moving object having a sinusoidal motion in one of the two directions, has an efficient motion. To that end it is sufficient for the period of the sinusoid to be sufficiently large versus amplitude.

This device tracks the moving objects equally well during their half-turns, not only because of the fact that it takes into account the distances projected upon the axes of coordinates, but also because of the fact that it allows of the averaging of the efficiency over a given time interval. Actually, if only one time interval is considered for the efficiency, that is to say the efficiency which examines the progress of the moving object between two consecutive instants, this measure will become invalid in the case of a half-turn, i.e. when the object reverses direction. In contrast thereto, while averaging the efficiency over a time interval which covers a sufficient number of consecutive time intervals, the half-turn effect is cancelled.

BRIEF DESCRIPTION OF THE DRAWING

The invention will now be described in greater detail with reference to the accompanying Figures, in which.

DESCRIPTION OF THE PREFERRED EMBODIMENTS

It is an object of the invention to provide a device for measuring in real time the motion efficiency of a moving object along a path, particularly as observed in a sequence of images, the device comprising means for satisfying at least one of the following criteria:

effecting a measurement independent of any scale factor, effecting a measurement which is discriminative against the displacements considered as being insignificant;

effecting a measurement applicable to slow moving objects which are not pointsized;

effecting a measurement which remains valid when the moving object takes half turns.

Slow moving objects must be considered to be moving objects whose displacement is of the order of some pixels during the time separating two consecutive images.

The device for measuring in real time the motion efficiency of a moving object progressing along a path $T_1$ in a sequence of images, is based on the algorithms defined hereinafter.

Figure 1:
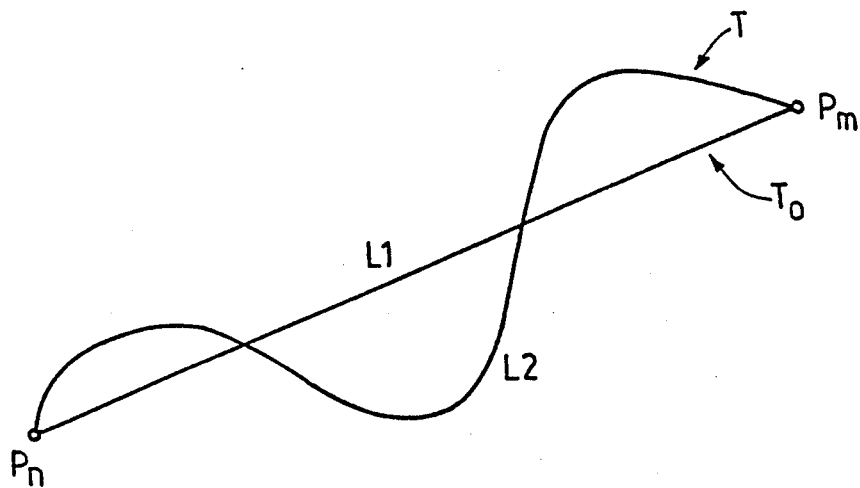
FIG. 1 shows an example of the path $L_2$ as detected by an coordinate extractor, and the straight-line path $L_1$ corresponding thereto.

Referring to FIG. 1, first the motion efficiency will be defined. The motion efficiency is the ratio between the distance $L_1$ measured in a straight line between two points $P_n$ and $P_m$ of the path T, these points being designated at two given instants separated by a time interval $\tau_1$, and the distance $L_2$ actually passed-through by the moving object along this path T during this time interval.

Figure 2:
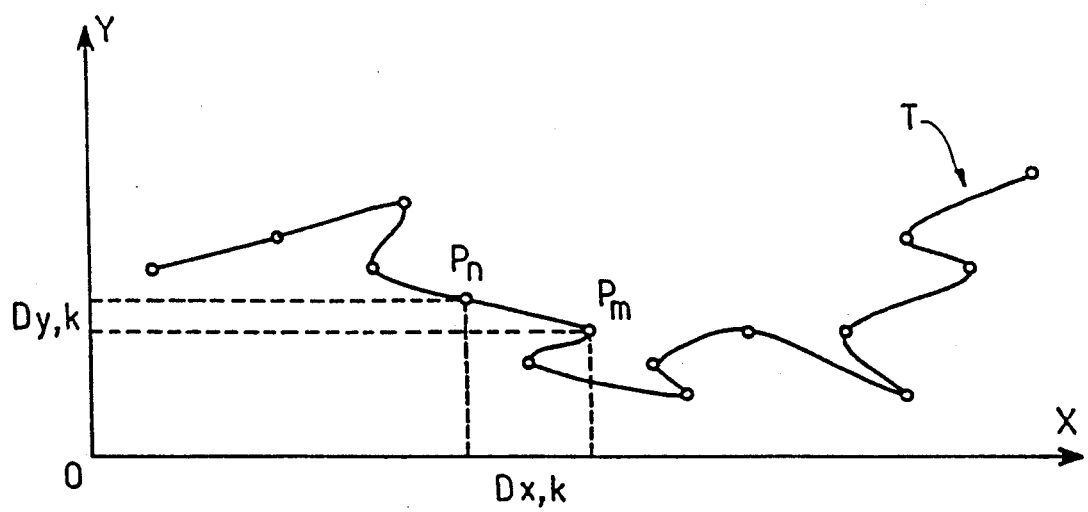
FIG. 2 shows the decomposition of the distances between points of a path, along two axes of the plane of investigation of the path.

Referring to FIG. 2, and for reasons of robustness of the measurements and speed of calculation, the elementary displacement $P_nP_m$ along the path T is broken-up in its two components along two flat spatial axes of coordinates of the image, for example two axes of orthogonal coordinates $X^*$ and $Y^*$.

The components $P_n-P_m$ along $X^*$ and $Y^*$, respectively, are designated $D_{x,k}$ and $D_{y,k}$ in the sequel of this description, wherein k is an index which can vary with time. Thus, a moving object is said to move in an efficient manner when it moves in an efficient manner in at least one direction $X^*$ or $Y^*$.

In FIG. 2 a two-dimensional space is shown: therefore, two coordinate axes are defined, which leads to the examination of the two components of a displacement along these two axes. It should be noted that, if necessary, the space considered may be a multidimensional space, for example having N dimensions; then N coordinate axes are defined, and for example the N components of a displacement along these N axes may be examined.

If an elementary measurement of the displacement of the moving object along the path T is considered, that is to say a measurement between two consecutive instants separating two consecutive images in real time, difficulties will be met when the path shows irregularities as illustrated in FIG. 2. For that reason, in accordance with the invention, the measurement of the motion efficiency is effected over a time interval $\tau_1$ covering several elementary displacements of the moving object, for example $n_1$ of these displacements, so that the effect of irregularities of the path are taken into account.

For choosing $\tau_1$ the following considerations hold: $\tau_1$ should be made smaller than the expected interval between course changes of the object, and also smaller than the required maximum time delay of the reaction of the device to object detection. Otherwise, larger $\tau_1$ will provide increasingly reliable detection.

When the motion efficiency is sufficiently large, the object may be selected for further processing, or for generating a response, such as an alarm to a human operator or an evasive action. A threshold efficiency, above which the object will be selected may be selected in dependence of the statistical properties of the problem, for example by measuring motion efficiency of objects known to be at standstill or to move randomly. For later use in object selection the threshold could then be set such measured efficiencies. A desired threshold can also be calculated form statistical parameters of the observable objects.

The motion efficiency measurement applied to a path T, as shown in FIG. 2, comprises a sum of the displacements whose implementation poses problems.

According to an embodiment of the invention, these problems are solved by replacing the exact summations over a finite period of time by weighted summations over an infinite period of time. The weighted summations can then be implemented in a simple manner as will be described hereinafter. It will prove that the sums employed in the measurement are not exact sums (but weighted sums) and that these operations furnish an approximation of the measurement of the distances. So as to render the measurement of the distance in a straight line $L_1$ consistent with the measurement of the distance $L_2$ effectively passed through, the same form of implementation will be used for either of these measurements.

Acting thus, a valid measurement of the average of the motion efficiency is obtained. However it appears that in the case that the moving object can make a half-turn or half-turns, this measurement becomes incorrect. Half-turn is here understood to mean any sudden change of course. In accordance with an embodiment of the invention, when it is required that the effects of such half turns upon selection must be eliminated, the efficiency is averaged over a second period of time $\tau_2$ exceeding $\tau_1$. $\tau_2$ should be made smaller than the required maximum time delay of the reaction of the device to object detection. Otherwise, larger $\tau_2$ means increasingly reliable detection. Thus, account is taken of the problem linked with half-turns and the measurement effected by the device remains reliable in spite of any path irregularities.

Under some circumstances, the sequence of images to be studied may include, in addition to the moving object(s), quasi-static objects which one does not want to detect. It may be desirable to suppress the information components, that is to say the coordinates of the points corresponding to these objects whose motion is too weak, i.e. not significant.

On the other hand, it will be remembered that in accordance with the invention, an object to be achieved is to provide a device providing a motion efficiency measurement which does not depend on a scale factor. These two conditions seem to be contradicting.

The difficulty met in solving these two problems simultaneously is obviated by providing the device with means for estimating whether a given displacement can or cannot be considered to be significant. The notion significant displacement must therefore be understood to mean the displacement whose magnitude exceeds a predetermined value, a threshold value. Below the value of the threshold, the displacements are considered to be zero, and above the value of the threshold they will be considered to be significant. Thus, the device renders it possible to count the significant displacements.

In addition, it will be remembered that when selection of objects must be obtained even when the object exhibits a half turn, the device provides for averaging of the motion efficiency. This may be combined by weighting the measurement of the motion efficiency by the average number of significant displacements. The average number of significant displacements is obtained by taking the weighted sum, in accordance with the said criterion as regards the summations of displacements, of the count of the significant displacements.

Figure 3:
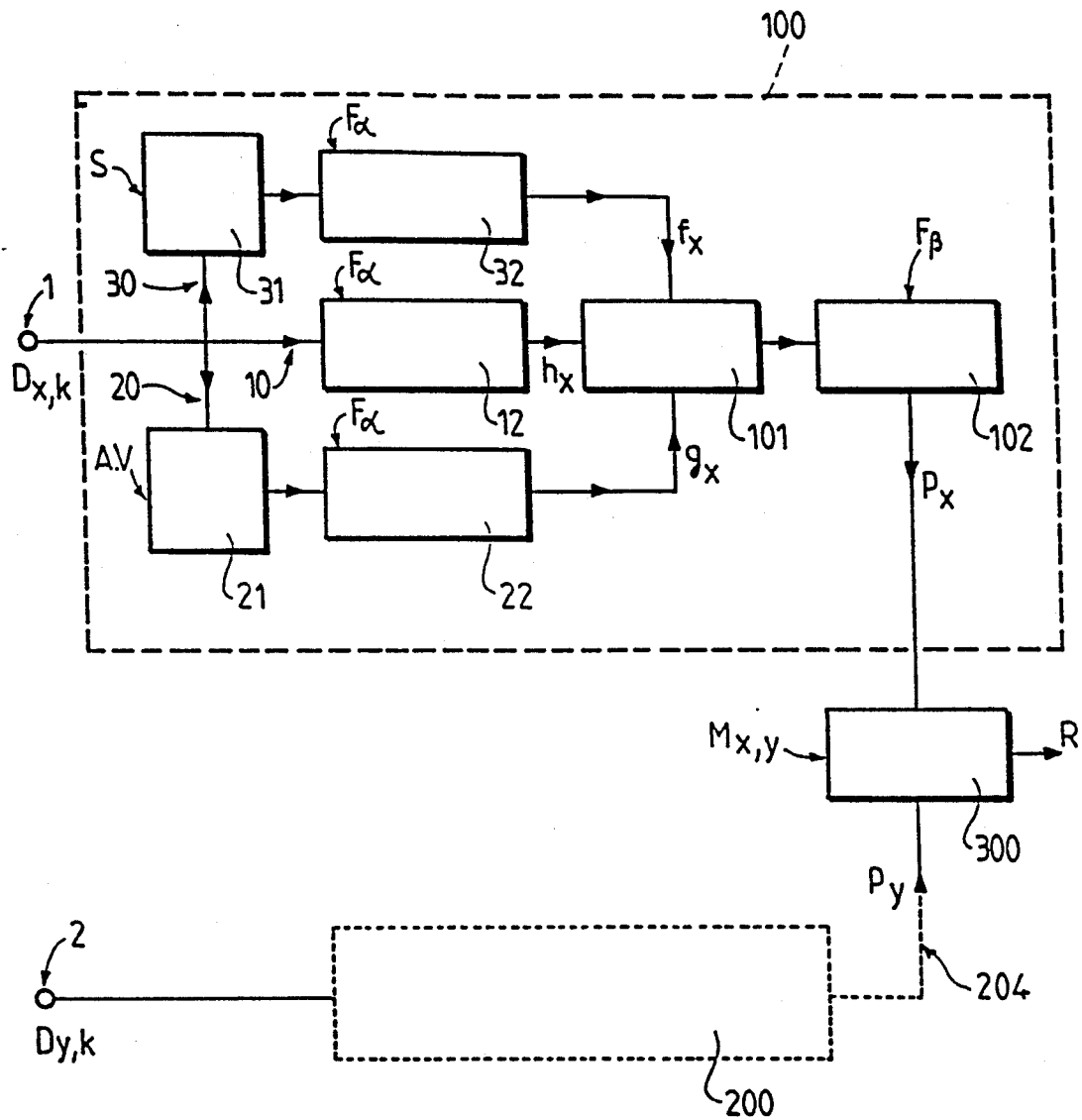
FIG. 3 shows means for the processing of components along these two coordinate axes, which are assembled such as to form a motion efficiency measuring device.

To implement the method described hereinbefore, the measuring device includes first of all a number N of branches equal to the number N of dimensions, the space considered. As is shown in FIG. 3 which relates to a two-dimensional space, the measuring device comprises two branches, 100 and 200, respectively. The first branch receives at its input node 1 the measurements of the coordinates $D_{x,k}$ along the axis X*, the second branch 200 receives at the input node 2 the measurements of the coordinates $D_{y,k}$ along the axis Y*. The measurements of the coordinates $D_{x,k}$ and $D_{y,k}$ are provided by an extractor known to a person skilled in the art, which extractor does strictly speaking not form part of the invention. An N branch device receives at these said branches respectively the measurement of the coordinates along the respective N axes of the space denoted s(k).

Each branch 100, or 200, is formed by means, or blocks, performing identical functions. This will also hold when the device comprises N branches. Therefore only the branch 100 to which the measurement $D_{x,k}$ along the axis X* are applied will be described in detail.

The branch 100 includes first of all three parallel branches:

a first branch 10 represented by the median branch of FIG. 3; this branch 10 provides the distance $L_1$, i.e. the distance covered in a straight line with reference to FIG. 1;

a second branch 20, represented by the lower branch of the block 100, in FIG. 3; this branch provides the distance $L_2$ actually passed through, in the same time interval $\tau_1$ as $L_1$.

a third branch 30, represented by the higher branch of the block 100 in FIG. 3; this branch provides the average of the number of significant displacements.

The branch 10, or median branch in FIG. 3, is coupled to the input 1 to receive the measurements $D_{x,k}$ along the axis X*, and includes a block 12 constituted by a first-order recursive filter $F\alpha$, defined by a memory coefficient $\alpha$. This filter receives the invariable data flow $D_{x,k}$. The coefficient $\alpha$ is linked to the time interval $\tau_1$ through which the measurement is integrated, or rather to the number of images $n_1$ realized during the time interval $\tau_1$. This number of images $n_1$ corresponds to the minimal error possible between the approximated value provided by the device and an accurate average of $n_1$ measurements. In these conditions, the linear filter $F\alpha$ used in the branch 10 performs the calculation expressed by the relation (1):

$$h(k) = \alpha \cdot h(k-1) + D_{x,k} \tag{1}$$

Thus, at the end of a calculation of the order $(k-1)$, the recursive filter $F\alpha$ takes its output $h(k-1)$ and reinjects it at its input 1 while multiplying it by $\alpha$. Because of the subsequent calculation of the order $(k)$, this results in its output $h(k)$ being the sum of $\alpha \cdot h(k-1)$ and the incoming input signal of the order k, which is $D_{x,k}$.

When a device having N main branches is used, the relation 1 is written for each main branch:

$$h(k) = \alpha \cdot h(k-1) + s(k) \tag{1bis}$$

In the foregoing $\alpha$ is defined as a memory coefficient applied to the filter $F\alpha$. Memory coefficient must be understood to mean a factor $\alpha$ of the type:

$$0 < a < 1 \tag{2}$$

Because of this factor, the sum (1) comprises a first factor $a.h(k-1)$, which is an "attenuation" factor. If the expression of the sum (1) is developed, sums of the attenuation factor appear clearly as is shown by the relation (3):

$$h(k) = D_{x,k} + aD_{x,k-1} + x^2 D_{x,k-2} \tag{3}$$

The terms of this sum in the relation (3) are correspondingly smaller than the power affecting the coefficient $a$ is higher. Hence the notion memory coefficient.

There is nevertheless a similarity between this summation in the relation (3) and an accurate summation over a finite period of time. Actually, the summation (3) is a weighted summation over an infinite period of time, because of the fact that the terms of the summation tend to zero when the exponent of the memory coefficient $a$ tends to infinity. Using the first-order recursive filter $F_a$, having a memory coefficient $a$, there is therefore the possibility of realizing the implementation of a sum in a simple manner, with a certain approximation which depends on $a$, and consequently on the number $n_1$ of images over which the measurement is integrated. The output $h(k)$ of the block 12 is denoted $h_x$ in the Figure. The relation (4) gives the value of the coefficient $a$ of the filter $F_a$ which provides the best least squares approximation of a finite sum over $n_2$ elements of a signal $D_{x,k}$ which is constant for a weighted infinite summation realized by filtering this signal with this filter $F_a$ $$n_1 = 1 + 2 \frac{L_n(1 + a)}{-L_n a} \tag{4}$$

The branch 20, or lower branch in FIG. 3, is coupled to the input 1 to receive the measurement $D_{x,k}$ along the axis $X^*$, and first includes a block 21 formed by an absolute value circuit A.V. This circuit 21 may be constituted by a memory providing the associated absolute value function A.V. (for example a L.U.T., abbreviation of Look Up Table).

Thereafter the branch 20 includes, arranged at the output of the absolute value circuit A.V. a block 22 formed by a filter $F_a$ which is identical to the first-order recursive filter described in the foregoing, with reference to the first branch 10, or median branch of FIG. 3. The output $g_x$ of the block 22 of the branch 20 consequently supplies the sum of the absolute values of the distance $D_{x,k}$ passed through, which provides the distance $L_2$ actually covered during the time interval $\tau_1$ over a predetermined number of images $n_1$. Actually, in the case in which the path T, see FIG. 2, contains irregularities such, that it makes a backturn, the distance actually covered by the moving object comprises the sum of the path to and fro. On the other hand, the filter $F_a$ of the second branch 20 is identical to the filter of the first branch 10, that is to say it has the same memory coefficient $a$. So as to obtain, in one branch or the other, the first or second branch 10 and 20, respectively, coherent approximations about the calculation of the respective distances $L_1$, the distance in a straight line, and $L_2$, the distance effectively covered can be obtained.

The branch 30, or the lower branch in FIG. 3, is coupled to the input 1 to receive the measurement $D_{x,k}$ along the axis $X^*$, and first includes a block 31 providing a threshold S of the input measurement $D_{x,k}$. This block 31 may be in the form of a measuring circuit providing the threshold function S (for example a L.U.T. (Look-Up Table). In an example, this threshold circuit S can act such that, above a fixed threshold A PRIORI of 0.5 pixel, the displacement is then considered as being significant, and the threshold circuit supplies an output equal to 1. Or, below the threshold, the displacement is considered to be so small as to be disregarded, and the threshold circuit supplies an output equal to a 0. This results in a sequence of 0 and 1 being available at the output of the threshold block 31, which is then applied to the input of a block 32 formed by a filter $F_a$ indentical to the filters in the previously described branches 10 and 20. This block 32 effects a weighted summation of the significant displacements and supplies the output $f_x$ which is the average number of significant displacements during the time interval $\tau_1$, integrated over the number of images $n^1$.

Thus, at the output of the first-order recursive filter $F_a$, 12, 22 and 32, respectively, all those elements are available which are useful for building the first stage of the measuring operation, that is to say, the mean of the motion efficiency between the instants separated by the time interval $\tau_1$.

To this effects, the product of the average of the significant displacements is produced, by the absolute value of the straight-line displacement, divided by the effective displacement. This relation is written (5):

$$f_x \cdot |h_x / g_x| \tag{5}$$

This operation is implemented in a simple manner by the block 101, see FIG. 3, which comprises a multiplying circuit, a dividing circuit and an absolute value circuit. This block 101 receives the functions $f_x$, $h_x$ and $g_x$ and from its output supplies a measurment of the mean of the motion efficiency between two instants separated by the time interval $\tau_1$ which corresponds the memory coefficient $a$.

Thereafter, this measurement is integrated over a higher time scale so as to take account of the problems involved in half-turns. This integration is realised, see FIG. 3, using the block 102, which is formed by a first-order recursive filter $F_\beta$, having a memory coefficient $\beta$ of the type $0 < \beta < 1$.

This filter $F_\beta$ has a structure similar to the structure of the filters $F_a$ already described in the foregoing. However, since a different time scale is used, the factor $\beta$ differs from the factor $a$.

At the output of the block 102, constituted by the filter $F_\beta$, the signal $p_x$ is available which is an average of the motion efficiency observed between two given instants separated by a time period $\tau_1$ which corresponds to the factor $a$, this average itself corresponding to an integration time $\tau_2$ corresponding to the factor $\beta$.

With reference to FIG. 3, the measurements $D_{y,k}$ along the axis $Y^*$(see FIG. 2) are moreover applied to the input 2 of the branch 200. This branch incorporates blocks which are identical to the blocks of the branch 100, and are connected similarly. From its output this branch 200 supplies a measurement $p_y$ which is the average of the motion efficiency in the same conditions as $p_x$.

The respective outputs $p_x$ and $p_y$ of the branches 100 and 200 are applied to a block 300 which realises the "maximum of $p_x$ and $p_y$" function, denoted $M_{x,y}$. This block may be in the form of a conventional maximum value block. In an N-dimension block, the block 300 will realise the "maximum" function of all the signals p.

The output R of the maximum block 300 constitutes the measurement of the displacement efficiency looked for.

The device described will provide for the selective detection of efficiently moving objects. It is used in, for example, the real time processing of image sequences, applied more specifically to the tracking of slow moving objects which are not pointsized. However, it may also use other sources of measurement about displacement of objects, such as direct position or velocity measurements, or indirect measurements such as time of flight or doppler measurements of, for example reflected radar or laser beams.

I claim:

1. A device for outputting a selection signal indicating selective detection of physical objects on the basis of their motion, the device comprising:

first measuring means with a first output for a displacement signal representative of a measured amount of net displacement of the object during a time interval, second measuring means with a second output for a path length signal representative of a sum of measured distances travelled by the object during respective subintervals of the time interval, comparing means, with inputs coupled for receiving the displacement signal and the path length signal, and a selection output for outputting a selection signal which indicates selection, when a strength of the displacement signal exceeds a predetermined fraction of a strength of the path length signal.

2. A device according to claim 1, said displacement and path length signal being time dependent signals, as a function of a temporal position of the time interval, the comparing means comprising:

efficiency determining means, with inputs coupled for receiving the displacement signal and the path length signal, and an efficiency output for outputting an efficiency signal formed as a ratio of the displacement signal and the path length signal, averaging means, with an input coupled for receiving the efficiency signal, and an average output, for outputting an average of the efficiency signal over a further time interval, average comparing means, with an input coupled for receiving the average, and an output for outputting said selection signal when said average exceeds a predetermined threshold.

3. A device according to claim 2, comprising:

significant displacement detecting means, with a significance output for a significance signal, representative of a number of subintervals of said interval in which the object has travelled at least a predetermined minimum distance;

said averaging means having a further input coupled for receiving the significance signal, the averaging means being arranged for weighting the efficiency signal with the significance signal.

4. A device according to claim 1, 2 or 3, arranged for measuring movements of the object in a multidimensional space, the device comprising a plurality of respective first and second measuring means coupled to respective comparing means, each respective first and second measuring means from the plurality being arranged for forming the net displacement and path length signal for displacements and distances travelled in projection upon a respective spatial direction, the device comprising combination means, with inputs coupled for receiving respective selection signal from each respective comparing means, and a combination output outputting a further selection signal when at least one of said respective selection signals indicates selection of the object.

5. Device according to claim 1, 2 or 3, where the first measuring means comprises:

elementary displacement measuring means, with an output for outputting an elementary displacement signal representative of elementary displacements of the object measured in respective elementary time intervals; and recursive adding means, with an input coupled for receiving the elementary displacement signal, for adding the elementary displacement signal to a fraction of a previous value of the displacement signal, thus recursively forming successive values of the displacement signal.

6. A device according to claim 1, 2 or 3, where the second measuring means comprises:

elementary measuring means, with an output for outputting an elementary distance signal representative of elementary distances travelled by the object as measured in respective elementary time intervals; and recursive adding means, with an input coupled for receiving the elementary distance signal, for adding the elementary distance signal to a fraction of a previous value of the path length signal, thus recursively forming successive values of the path length signal.

7. A device according to claim 1, 2 or 3, where the averaging means comprises recursive adding means for adding successive values of the efficiency signal, weighted by said significance signal, to a fraction of a previous value of the average signal, thus forming successive values of the average signal.

* * * * *